C. GARCILLAN.
ADVERTISING DEVICE.
APPLICATION FILED JUNE 25, 1918.
1,303,650. Patented May 13, 1919.
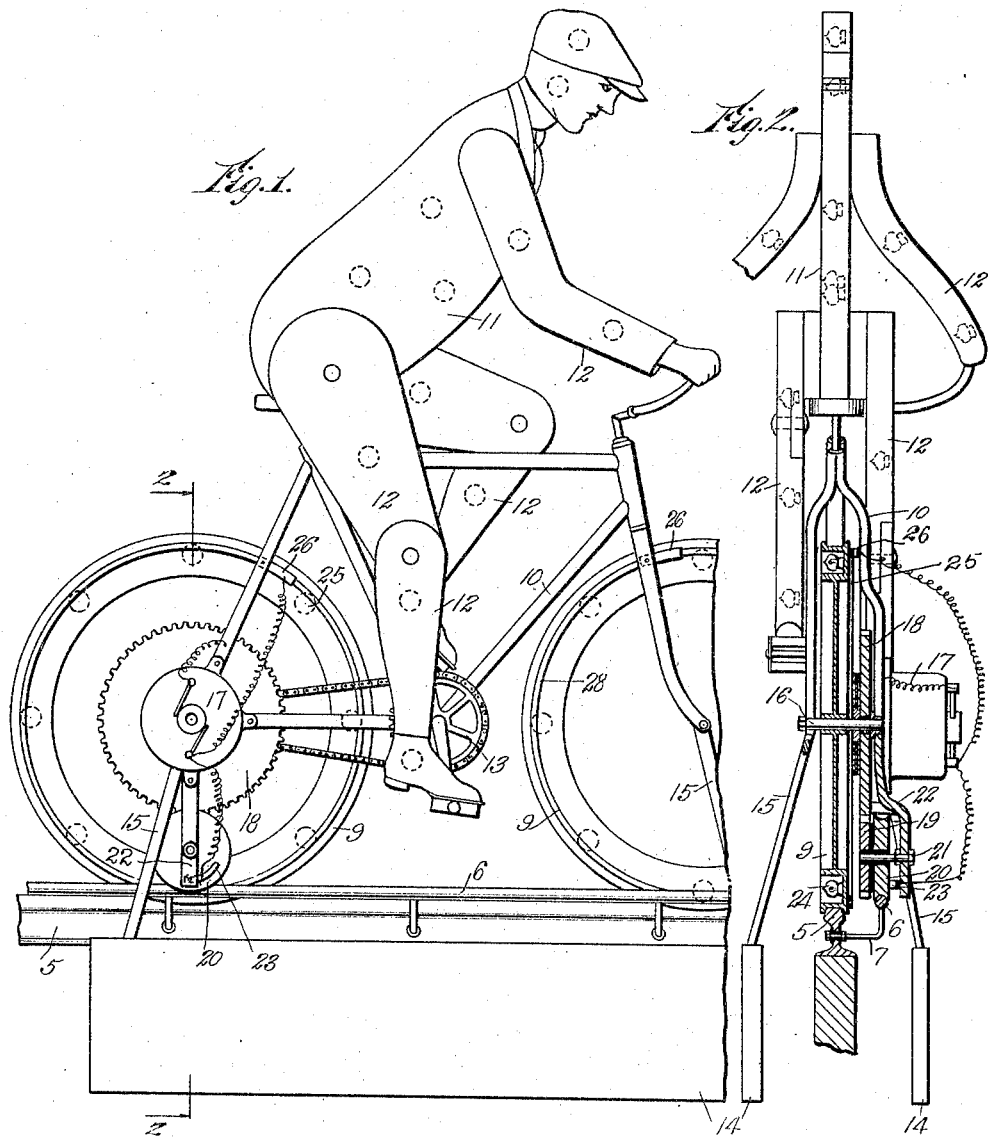
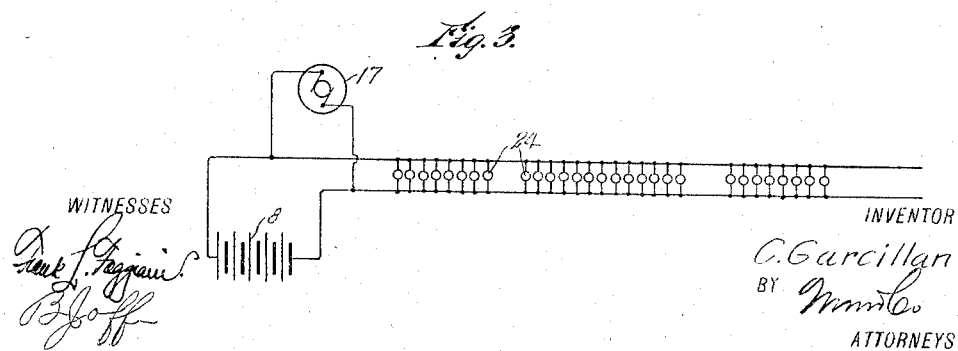

UNITED STATES PATENT OFFICE.

CIRIACO GARCILLAN, OF MEXICO, MEXICO.

ADVERTISING DEVICE.

1,303,650.  Specification of Letters Patent.  Patented May 13, 1919.

Application filed June 25, 1918. Serial No. 241,805.

*To all whom it may concern:*

Be it known that I, CIRIACO GARCILLAN, a subject of the King of Spain, residing in the city of Mexico, Mexico, have invented a new and Improved Advertising Device, of which the following is a full, clear, and exact description.

My invention relates to advertising devices of the illuminated type, and has reference more particularly to a device in which there is an illuminated movable object, as distinct from objects in which the movement is obtained by a light effect on the object.

An object of the invention is to provide a simple and efficient advertising device for which a suitable track is provided on which the illuminated object is adapted to travel.

Another object of the invention is to provide an advertising device the object of which moves on a mono-rail track on which the movable object is balanced by weights depending below the track.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in all the views.

Figure 1 is a side elevation of an advertising device embodying my invention;

Fig. 2 is a section on line 2—2, Fig. 1; and

Fig. 3 is an electrical diagram showing the method of illuminating the object.

Referring to the drawings, 5 is a track along which runs a conductor 6 supported from the track 5 by brackets 7 insulated from the track. To the conductor 6 a current is supplied from a suitable source 8 (see Fig. 3). On the track 5 the wheels 9 of the object are mounted. As shown the object is in the shape of a bicycle the frame 10 of which supports a representation 11 of a human being having articulated members 12 attached to the parts 13 of the frame and caused to move when the wheel is turned, in consequence, simulating the action of a bicycle rider.

The frame 10 is balanced on the track 5 by weights 14 connected to the frame by members 15, which members maintain the weights 14 below the track so that the object is in stable equilibrium on the track. The rear wheel is free to revolve on the axle 16 which forms part of the shaft of the motor 17 secured to the frame 10. With this axle a gear 18 is constrained to revolve. The gear 18 meshes with a pinion 19 which is, in turn, constrained to revolve with a roller or trolley 20, the shaft 21 for which is supported by a downward extension 22 of the frame 10, the roller 20 bearing on the conductor 6. This roller is insulated from the shaft and the pinion 19, a suitable brush 23 being provided on the extension 22 to receive the current from the trolley and convey it to the lamps 24 and motor 17.

The lamps on the wheels are connected to strips 25 insulated from the wheels and each engages a corresponding brush 26 to which current is supplied from the brush 23, the return conductor being formed by the frame of the machine. It will be noted that the lamps are in parallel, so that if some of the lamps are burned out the illumination of the object will not be interfered with.

From the above description it will be seen that motion is imparted to the object by the roller 20. The wheels 9 being free to turn on their axles will slip sufficiently not to interfere with the roller 20.

The roller 20 which forms the contact with the conductor 6 also serves as the means for propulsion of the object. It is self-evident that any wheeled object can be used for the advertisement, such, for example, as an automobile, a carriage, etc.

I claim:

1. In combination with a track, a wheeled object mounted to travel on the track, an electric conductor extending along the track, a contact member carried by the object engaging the conductor and constituting the propelling means for said object, electric motive means on the object, and means for actuating the contact from the electromotive means whereby motion is imparted to the object on the track.

2. In combination with a single track, a wheeled object on the track, weights for maintaining the object on the track in stable equilibrium, an electric conductor extending along the track, a roller carried by the object and engaging the conductor, an electric motor on the object, means for supplying current to the motor from the roller, and motion transmission means on the object from the motor to said roller.

3. In combination with a single track, a wheeled object mounted to travel on the track, weights connected to the object and depending below the track to maintain the object on the track in stable equilibrium, an electric conductor extending along the track, a roller carried by the object and engaging the conductor, electric lamps on the object adapted to receive current from the roller, an electric motor on the object adapted to receive the current from the roller, and motion-transmission means from said motor to said roller.

4. In combination with a track, a wheeled object mounted to travel on the track, an electric conductor extending along the track, a roller carried by the object and engaging the conductor, a motor carried by the object and adapted to receive the current from the roller, motion-transmission means from the motor to the roller, a figure having articulated members associated with the object, and means for connecting the articulated members of the figure to the motion-transmission means whereby said members are actuated when the object travels on the track.

CIRIACO GARCILLAN.

Copies of this patent may be obtained for five cents each, by addressing the "Commissioner of Patents, Washington, D. C."